(12) United States Patent
Burkhardt et al.

(10) Patent No.: US 9,739,217 B2
(45) Date of Patent: Aug. 22, 2017

(54) METHOD AND DEVICE FOR OPERATING AN INTERNAL COMBUSTION ENGINE

(71) Applicant: Continental Automotive GmbH, Hannover (DE)

(72) Inventors: Thomas Burkhardt, Neutraubling (DE); Markus Roth, Eltheim (DE); Joerg Mickeleit, Suedharz (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 5 days.

(21) Appl. No.: 14/912,304

(22) PCT Filed: Aug. 13, 2014

(86) PCT No.: PCT/EP2014/067370
§ 371 (c)(1),
(2) Date: Feb. 16, 2016

(87) PCT Pub. No.: WO2015/022383
PCT Pub. Date: Feb. 19, 2015

(65) Prior Publication Data
US 2016/0186676 A1    Jun. 30, 2016

(30) Foreign Application Priority Data
Aug. 14, 2013   (DE) .......... 10 2013 216 073

(51) Int. Cl.
*F02D 33/00* (2006.01)
*F02D 41/00* (2006.01)
(Continued)

(52) U.S. Cl.
CPC .......... *F02D 33/006* (2013.01); *F02D 35/00* (2013.01); *F02D 35/0015* (2013.01);
(Continued)

(58) Field of Classification Search
CPC .... F02D 33/006; F02D 35/00; F02D 35/0015; F02D 35/023; F02D 41/0002; F02D 2200/0402; Y02T 10/42
(Continued)

(56) References Cited

U.S. PATENT DOCUMENTS

| | | | |
|---|---|---|---|
| 5,060,611 A | * | 10/1991 | Krampe .............. F02D 41/0005 123/320 |
| 5,889,205 A | | 3/1999 | Treinies et al. ............ 73/114.32 |

(Continued)

FOREIGN PATENT DOCUMENTS

| | | | | |
|---|---|---|---|---|
| CN | 101087939 A | 12/2007 | ............. | F02D 41/14 |
| CN | 101353990 A | 1/2009 | ............. | F02D 41/00 |

(Continued)

OTHER PUBLICATIONS

Van Basshuysen, Richard et al., "Handbuch Verbrennungsmotor: Grudlagen, Komponenten, Systeme, Perspektiven," ATZ/MTZ Fachbuch, pp. 557-559 (6 pages) (German language w/ English statement of relevance), Jun. 2002.

(Continued)

*Primary Examiner* — Mahmoud Gimie
(74) *Attorney, Agent, or Firm* — Slayden Grubert Beard PLLC (57) ABSTRACT

The present disclosure provides a method for adjusting the operation of an internal combustion engine comprising: determining a gradient of an overrun-air line based on an ambient condition and a current operating point; determining a value for a cylinder air mass situated in a cylinder after closure of the gas exchange valves; and using the determined cylinder air mass to adjust one or more operating parameters of the internal combustion engine. The overrun-air line may correspond to an air mass situated in the respective cylinder after closure of the gas exchange valves (Continued)

at predefined operating temperature for the engine, when the engine is operated briefly without fuel metering and combustion. Determining a cylinder air mass may be based at least in part on the current operating point and the current ambient value of the at least one ambient variable.

9 Claims, 3 Drawing Sheets (51) Int. Cl.
*F02D 35/00* (2006.01)
*F02D 35/02* (2006.01)
(52) U.S. Cl.
CPC ....... *F02D 35/023* (2013.01); *F02D 41/0002* (2013.01); *F02D 2200/0402* (2013.01); *Y02T 10/42* (2013.01)
(58) Field of Classification Search
USPC ........................................................ 123/435
See application file for complete search history.

(56) References Cited

U.S. PATENT DOCUMENTS

| | | | | |
|---|---|---|---|---|
| 5,974,870 | A | 11/1999 | Treinies et al. | 73/114.33 |
| 6,115,664 | A | 9/2000 | Cullen et al. | 701/102 |
| 7,357,127 | B2 | 4/2008 | Dingl et al. | 123/684 |
| 7,415,345 | B2 | 8/2008 | Wild | 701/103 |
| 8,442,747 | B2 | 5/2013 | Ma et al. | 701/112 |
| 9,309,826 | B2 | 4/2016 | Wagner et al. | |
| 2004/0200464 | A1 | 10/2004 | Ikemoto | 123/673 |
| 2004/0204871 | A1 | 10/2004 | Frie et al. | 702/56 |
| 2008/0091333 | A1 | 4/2008 | Yamashita et al. | 701/103 |
| 2009/0070009 | A1 | 3/2009 | Delp | 701/103 |

FOREIGN PATENT DOCUMENTS

| | | | | |
|---|---|---|---|---|
| CN | 102062005 A | 5/2011 | ............ | F02D 41/00 |
| CN | 102312743 A | 1/2012 | ............ | F02D 41/18 |
| CN | 102939453 A | 2/2013 | ............ | F01L 1/20 |
| CN | 103161599 A | 6/2013 | ............ | F02D 45/00 |
| DE | 102004030604 B3 | 2/2006 | ............ | F02D 41/00 |
| EP | 0886725 B1 | 8/1999 | ............ | F02D 21/08 |
| EP | 0820559 B1 | 9/1999 | ............ | F02D 41/04 |
| EP | 1593829 A1 | 11/2005 | ............ | F02D 13/02 |
| EP | 1662128 A1 | 5/2006 | ............ | F02D 41/00 |
| WO | 2015/022383 A1 | 2/2015 | ............ | F02D 41/00 |

OTHER PUBLICATIONS

German Office Action, Application No. 102013216073.9, 4 pages, Apr. 17, 2014.
International Search Report and Written Opinion, Application No. PCT/EP2014/067370, 15 pages, Nov. 14, 2014.
Chinese Office Action, Application No. 201480041757.3, 5 pages, dated Jul. 5, 2017.

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2014/067370 filed Aug. 13, 2014, which designates the United States of America, and claims priority to DE Application No. 10 2013 216 073.9 filed Aug. 14, 2013, the contents of which are hereby incorporated by reference in their entirety.

TECHNICAL FIELD

The invention relates to a method and to a device for operating an internal combustion engine having one or more cylinders, which are each assigned gas inlet valves.

BACKGROUND

Ever more stringent regulations with regard to admissible pollutant emissions of motor vehicles with internal combustion engines require the pollutant emissions during the operation of the internal combustion engine to be kept as low as possible. This may be realized firstly by reducing the pollutant emissions that arise during the combustion of the air/fuel mixture in the respective cylinders of the internal combustion engine. Secondly, in internal combustion engines, exhaust-gas after treatment systems may convert the pollutant emissions generated during the combustion process of the air/fuel mixture in the respective cylinders into benign substances. For this purpose, use is made of exhaust-gas catalytic converters which convert carbon monoxide, hydrocarbons and nitrogen oxides into benign substances.

Both the reduced generation of the pollutant emissions during the combustion in the respective cylinder and the conversion of the pollutant components with high efficiency by way of the exhaust-gas catalytic converter necessitate a very precisely set air/fuel ratio for the respective cylinder.

An intake pipe charging model is described for example in the specialist book "Handbuch Verbrennungsmotor, Grundlagen, Komponenten, Systeme, Perspektiven" ["Internal combustion engine compendium, principles, components, systems, perspectives"], $2^{nd}$ improved edition, publisher Richard vanBasshuysen/Fred Schäfer, $2^{nd}$ improved edition, June 2002, Friedrich Vieweg & Sohn Verlagsgesellschaft mbH, Braunschweig/Wiesbden, pages 557 to 559. Furthermore, intake pipe models of said type are also described in EP 0820559 B1 and EP 0886725 B1.

SUMMARY

The teachings of the present disclosure provide a method and a device for operating an internal combustion engine conducive to reliable operation of the internal combustion engine with low emissions.

In some embodiments, a method and a corresponding device may be used for operating an internal combustion engine having one or more cylinders which are each assigned gas inlet valves and gas outlet valves. Gas exchange valves comprise gas inlet valves and gas outlet valves.

In a manner dependent on a current operating point of the internal combustion engine, a gradient of an overrun-air line is determined for a current ambient value of at least one ambient variable of the internal combustion engine. The respective current operating point is characterized in particular by a tuple of operating variables of the internal combustion engine, which are in particular representative of a load. Said operating variables may comprise for example an engine speed and/or an intake pipe pressure and/or adjustment characteristics of actuators close to the cylinder, such as for example camshaft adjusters for phase and/or lift, swirl flaps, a variable intake pipe and the like. The respective ambient variable differs in particular from the variables used for characterizing the operating point.

The overrun-air line characteristics may correlate to those of an air mass situated in the respective cylinder after closure of the gas exchange valves if, in the case of the internal combustion engine being at a predefined operating temperature, said internal combustion engine is operated briefly without fuel metering and combustion.

In some embodiments, a cylinder air mass situated in the respective cylinder after closure of the gas exchange valves is determined for the respectively current operating point and the respectively current ambient value of the at least one ambient variable in a manner dependent on the gradient of the overrun-air line and a current characteristic value of a characteristic variable influenced by the ambient variable. The characteristic variable may be, for example, an intake air temperature in the region of the respective gas inlet valve and/or an intake pipe pressure.

In this way, a precise determination of the cylinder mass is possible, in particular in a manner which conserves memory capacity.

In some embodiments, an ambient variable is an ambient temperature and/or an ambient pressure and/or an exhaust manifold pressure. In these embodiments, a precise determination of the cylinder air mass using data determined in advance, for example on an engine test stand, is possible in a particularly simple manner, along with a simple adaptation to the respective ambient temperature and the respective ambient pressure.

In some embodiments, a residual gas mass for the respective cylinder is determined under predefined reference conditions in relation to the at least one ambient variable in a manner dependent on the current operating point. A residual gas mass for the respective cylinder may be determined, taking into consideration the respective current ambient value of the at least one ambient variable in a manner dependent on the current operating point.

The cylinder air mass may be determined in a manner dependent on the residual gas mass for the respective cylinder under predefined reference conditions and dependent on the residual gas mass for the respective cylinder taking into consideration the respective current ambient value of the at least one ambient variable. In this way, the cylinder air mass can be determined in a precise manner with economical use of data memory resources.

In some embodiments, a reference intake pipe temperature is determined under predefined reference conditions in relation to the at least one ambient variable in a manner dependent on the current operating point. The cylinder air mass is determined in a manner dependent on the reference intake pipe temperature.

In some embodiments, a reference exhaust manifold temperature is determined under predefined reference conditions in relation to the at least one ambient variable in a manner dependent on the current operating point. The cylinder air mass is determined in a manner dependent on the reference exhaust manifold temperature.

In some embodiments, a reference exhaust manifold pressure is determined under predefined reference conditions in relation to the at least one ambient variable in a manner dependent on the current operating point. The cylinder air mass is determined in a manner dependent on the reference exhaust manifold pressure.

In some embodiments, a reference inlet air mass is determined under predefined reference conditions in relation to the at least one ambient variable in a manner dependent on the current operating point. The cylinder air mass is determined in a manner dependent on the reference inlet air mass.

In some embodiments, a reference scavenging air mass is determined under predefined reference conditions in relation to the at least one ambient variable in a manner dependent on the current operating point. The cylinder air mass is determined in a manner dependent on the reference scavenging air mass.

In particular, a model-based approach may be used in the determination of the cylinder air mass.

The various embodiments of the teachings of the present disclosure may offer various advantages. The fact that the correction of ambient pressure influences can be determined by way of a set of formulae rather than by way of a data-driven local correction may save considerable memory capacity in the respective data and/or program memory.

Furthermore, it is possible for outlay for calibration to be kept very low, in particular greatly reduced, because, owing to the possibility of taking into consideration an engine geometry, a measurement of the respective internal combustion engine under changed ambient conditions can be reduced to a much coarser raster.

Furthermore, a reproduction of so-called component derivatives, specifically different exhaust systems in vehicle derivatives, is possible in a particularly simple manner while maintaining a base dataset, in particular in an existing software implementation.

BRIEF DESCRIPTION OF THE DRAWINGS

Exemplary embodiments of the invention will be discussed in more detail below on the basis of the schematic drawings, in which.

DETAILED DESCRIPTION

Elements of identical construction or function are denoted by the same reference signs throughout the figures.

Figure 1:
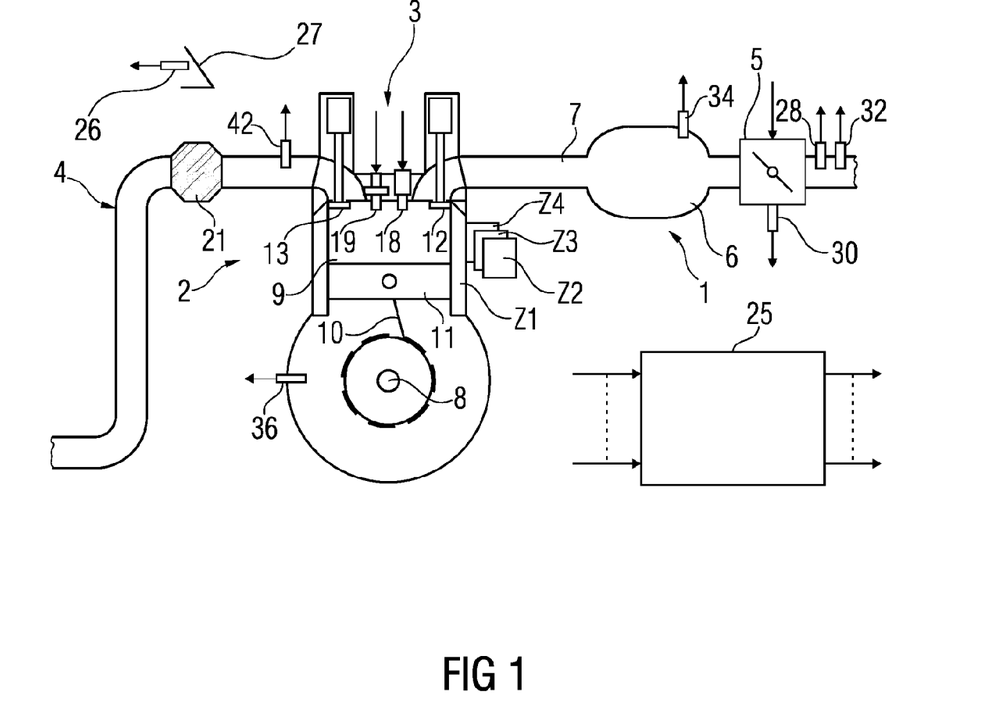
FIG. 1 shows an internal combustion engine with an associated control device, according to teachings of the present disclosure.

An internal combustion engine comprises an intake tract 1, an engine block 2, a cylinder head 3 and an exhaust tract 4.

The intake tract 1 may comprise a throttle flap 5, a manifold 6 and an intake pipe 7 which leads to a cylinder Z1 via an inlet duct into a combustion chamber 9 of the engine block 2. The engine block 2 comprises a crankshaft 8 which is coupled by way of a connecting rod 10 to a piston 11 of a cylinder Z1. The internal combustion engine may comprise further cylinders Z2, Z3, Z4 in addition to the cylinder Z1. The internal combustion engine may however also comprise any other desired number of cylinders. The internal combustion engine may be arranged in a motor vehicle.

In the cylinder head 3 there may be arranged an injection valve 18 and an ignition plug 19. Alternatively, the injection valve 18 may also be arranged in the intake pipe 7. In the exhaust tract 4 there may be arranged an exhaust-gas catalytic converter 21 in the form of a three-way catalytic converter.

Furthermore, a phase adjustment means may also be provided, which is for example coupled to the crankshaft 8 and to an inlet camshaft. The inlet camshaft is coupled to a gas inlet valve of the respective cylinder. The phase adjustment means is designed to permit an adjustment of a phase of the inlet camshaft relative to the crankshaft 8. Furthermore, the phase adjustment means may basically alternatively or additionally also be designed to adjust a phase of an outlet camshaft relative to the crankshaft 8, wherein the outlet camshaft is coupled to a gas outlet valve 13.

Furthermore, it is also possible for a switching flap or some other switching mechanism for varying an effective intake pipe length to be provided in the intake tract 1. Furthermore, it is for example also possible for one or more swirl flaps to be provided.

Furthermore, it is also possible for a supercharger to be provided, which may for example be in the form of an exhaust-gas turbocharger and thus comprises a turbine and a compressor.

A control device 25 may have associated sensors which measure various measurement variables and determine, in each case, the measurement value of the measurement variable. Operating variables of the internal combustion engine include the measurement variables and variables derived from the measurement variables.

The control device 25 may determine, in a manner dependent on at least one measurement variable, control variables which are then converted into one or more control signals for the control of the control elements by way of corresponding control drives. The control device 25 may also be referred to as a device for operating the internal combustion engine. The sensors may include, for example, a pedal position transducer 26, which detects an accelerator pedal position of an accelerator pedal 27, an air mass sensor 28, which detects an air mass flow upstream of the throttle flap 5, a throttle flap position sensor 30, which detects a degree of opening of the throttle flap 5, an ambient pressure sensor 32, which detects an ambient pressure in the surroundings of the internal combustion engine, an intake pipe pressure sensor 34, which detects an intake pipe pressure in the manifold, a crank angle sensor 36, which detects a crankshaft angle, to which a speed of the internal combustion engine is then assigned. Furthermore, an exhaust-gas probe 42 is provided which is arranged upstream of the exhaust-gas catalytic converter 21 and which detects, for example, a residual oxygen content of the exhaust gas of the internal combustion engine, and the measurement signal of which is representative of an air/fuel ratio upstream of the exhaust-gas probe 42 before the combustion. For the detection of the position of the inlet camshaft and/or of the outlet camshaft, an inlet camshaft sensor and/or an outlet camshaft sensor may be provided. Furthermore, it is preferable for a temperature sensor to be provided which detects an ambient temperature of the internal combustion engine, and/or for a further temperature sensor to be provided, the measurement signal of which is representative of an intake air temperature in the intake tract 1. Furthermore, it is also possible for an exhaust-gas pressure sensor to be provided, the measurement signal of which is representative of an exhaust manifold pressure, that is to say a pressure in the exhaust tract 4.

Depending on the embodiment, any desired subset of the stated sensors may be provided, or additional sensors may also be provided.

The control elements may include, for example, the throttle flap 5, the gas inlet and gas outlet valves 12, 13, the injection valve 18 or the phase adjustment means or the ignition plug 19 or an exhaust-gas recirculation valve.

Internal combustion engines which operate on the basis of the four-stroke principle draw the air intended for the combustion of the fuel into the respective cylinders Z1 to Z4 through gas inlet valves 12, which open for this purpose, during the intake stroke. The exhaust gases generated as a result of the combustion of the fuel in the cylinders Z1 to Z4 are discharged into the exhaust tract 4 through gas outlet valves 13, which open for this purpose, in the exhaust stroke. A theoretically maximum possible enclosed cylinder air mass $m_{air,cyl,th}$ in this case refers to the air mass which would exactly fill the entire swept volume $v_{disp}$ Of the cylinder Z1 to Z4, that is to say the difference between the cylinder volumes at bottom dead center and at top dead center, at the ambient pressure $p_0$ prevailing around the internal combustion engine and the ambient temperature $T_0$ prevailing around the internal combustion engine, while the cylinder dead volume that remains at top dead center is filled with exhaust gas:

$$m_{air,cyl,th} = \frac{p_0 \cdot V_{disp}}{R_{air} \cdot T_0},$$

During engine operation, the fresh-air charge $m_{air,cyl}$ involved in the combustion of the fuel may differ from the theoretically maximum possible enclosed fresh-air charge $m_{air,cyl,th}$ for various reasons.

One reason is that the intake pipe pressure $p_{im}$ prevailing upstream of the gas inlet valves 12 may lie below ambient pressure owing to throttling at components of the air path of the internal combustion engine, such as for example air filter or throttle flap, or may lie above ambient pressure in the case of supercharging, for example by way of the turbocharger.

A further reason is that the intake pipe temperature $T_{air,im}$ prevailing upstream of the gas inlet valves 12 generally lies above the ambient temperature $T_0$ as a result of introduction of heat from the internal combustion engine into the fresh air.

A further reason is that the temperature $T_{air,cyl}$ of the air that has flowed into the respective cylinders Z1 to Z4 generally lies above the intake pipe temperature $T_{air,im}$ as a result of introduction of heat from the cylinder walls.

A further reason is that pressure oscillations in the intake tract, in particular in the respective intake pipe, and in the exhaust tract 4, which can also be referred to as exhaust manifold, give rise to deviations from steady-state/temporally averaged states.

A further reason is that exhaust gas generated in a preceding working cycle has—in part intentionally—not been completely discharged from the respective cylinder Z1 to Z4. The gas remaining in the cylinder Z1 to Z4 or in the intake tract 1 of the internal combustion engine after the closure of the gas outlet valves 13 is referred to as residual gas. In the case of a lean air/fuel mixture, the residual gas comprises not only exhaust gas but also air not consumed by the combustion, or in the case of a lean air/fuel mixture, the residual gas comprises hydrocarbons. A stoichiometric air/fuel mixture is assumed for the following observations. Thus, the residual gas is composed exclusively of exhaust gas, also referred to as burnt gas. The residual gas mass in the respective cylinder is referred to by $m_{bg,cyl}$.

For a lean air/fuel mixture, the following observations can be correspondingly expanded by taking into consideration the air in the residual gas. For a rich air/fuel mixture, the following observations can be correspondingly expanded by taking into consideration the unburned fuel in the residual gas.

A yet further reason is that, in the case of internal combustion engines with external exhaust-gas recirculation, it is not pure air but an exhaust gas-air mixture that is drawn into the respective cylinders Z1 to Z4 from the intake tract 1 via the gas inlet valves 12, and it is thus the case that air is—intentionally—displaced by exhaust gas. An internal combustion engine without external exhaust-gas recirculation is assumed for the following observations. For engines with external exhaust-gas recirculation, the following observations can be correspondingly expanded by taking into consideration the exhaust gas in the intake pipe gas mixture.

A further reason is that, in the case of internal combustion engines with intake pipe injection of the fuel, the evaporation of the liquid fuel, or the expansion of the gaseous fuel, causes the gas mixture in the respective cylinder Z1 to Z4 to be cooled and the density thereof increased already before it is enclosed in the respective cylinder Z1 to Z4. An engine with direct injection, that is to say without intake pipe injection of the fuel, is assumed for the following observations. For internal combustion engines with intake pipe injection, the following observations can be correspondingly expanded by taking into consideration the fuel in the cylinder gas mixture.

A yet further reason is that, in operating points with valve overlap, in the event of a pressure gradient from the intake pipe to the exhaust manifold $p_{im} > p_{em}$, of the inlet air mass $m_{air,inv}$ drawn in by the internal combustion engine via the gas inlet valve during the gas inlet valve opening phase, wherein the abbreviation INV stands for inlet valve, a part $m_{air,scav}$ can be scavenged through the cylinder Z1 into the exhaust manifold. This is also referred to as scavenging, and only a part $m_{air,cyl}$ is enclosed in the respective cylinder Z1 and referred to as cylinder air mass.

$$m_{air,inv} = m_{air,cyl} + m_{air,scav} \qquad ((2))$$

The ratio between the cylinder air mass $m_{air,cyl}$ enclosed in the cylinder Z1 and inlet air mass $m_{air,inv}$ drawn in via the gas inlet valve 12 is referred to as trapping efficiency $\alpha$, $$\alpha = \frac{m_{air,cyl}}{m_{air,inv}}. \qquad ((3))$$

The ratio between the cylinder air mass $m_{air,cyl}$ currently enclosed in the respective cylinder Z1 to Z4 and the theoretically maximum possible drawn-in air mass $m_{air,cyl,th}$ is also referred to as volumetric efficiency $\eta$:

$$\eta = \frac{m_{air,cyl}}{m_{air,cyl,th}}. \qquad ((4))$$

The volumetric efficiency η is determined by the speed $N_{eng}$ of the crankshaft 8—also referred to as engine speed, the intake pipe pressure $p_{im}$, wherein the pressure upstream of the gas inlet valve 12 at the time of the closure of the inlet valve 12 is of importance here, the temperature in the intake tract 1, in particular the temperature upstream of the respective gas inlet valve 12—also referred to as intake pipe temperature $T_{air,im}$, an exhaust-gas pressure $p_{em}$ in the exhaust tract 4, specifically in particular at the time of the closure of the gas outlet valve 13, an exhaust-gas temperature $T_{bg,em}$ in the exhaust tract 4, positions of all charge-influencing actuators, such as phase adjustment means, of a lift adjustment means for an adjustment of the lift of the gas inlet and/or gas outlet valves 12, 13, swirl flaps or a variable intake pipe, furthermore a quantity, manner and time of injection of the fuel, and possibly further influential variables, such as for example a coolant temperature, the air/fuel ratio or the like.

An estimated value $m_{air,cyl}$ of the air mass drawn into the respective cylinders Z1 to Z4, also referred to as cylinder air mass, is a main input variable for the determination of the fuel metering, and should be precisely known, in particular to within a few percent, in the control device 25 under all engine operating conditions in order to adhere to pollutant emissions limit values.

Figure 2:
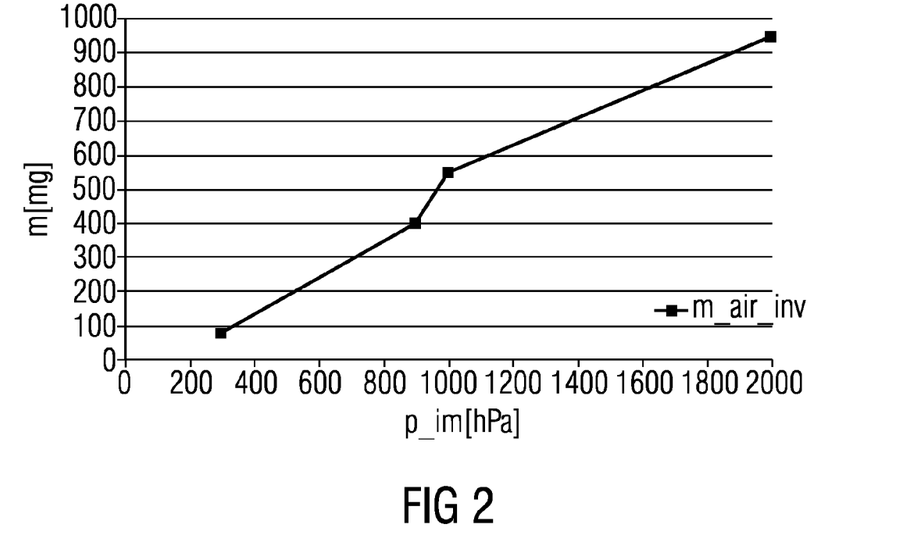
FIG. 2 shows an air mass flow curve of the internal combustion engine, according to teachings of the present disclosure.

The inlet air mass $m_{air,inv}$ drawn in via the gas inlet valve 12 is measured for a reference engine under known ambient conditions (reference ambient pressure $p_{0,ref}$ and reference ambient temperature $T_{0,ref}$) on the engine test stand at all relevant engine operating points, for example by way of an air mass sensor. Here, it is normally the case that engine speed $N_{eng}$, intake pipe pressure $p_{im}$ and the position of all n charge-influencing actuators $s=[s_1, s_2, \ldots, s_n]$ are varied through the entire adjustment range, and the engine operating point is determined as a combination of said parameters. The reference inlet air mass $$m_{air,inv,ref} = m_{air,inv}(N_{eng}, p_{im}, s)|_{T_{0,ref}, p_{0,ref}} \quad ((5))$$

measured here and the reference scavenging air mass $$m_{air,scav,ref} = m_{air,scav}(N_{eng}, p_{im}, s)|_{T_{0,ref}, p_{0,ref}} \quad ((6))$$

measured here are in this case stored with high accuracy in a model. It is thus ensured that the cylinder air mass is modeled with the high accuracy at engine operating points close to the reference conditions. The function $m_{air,inv,ref} = f(p_{im})$ is generally referred to as the air mass flow curve of the engine at engine speed $N_{eng}$ and actuator position s. Below, it is assumed that the air mass flow curve of the engine for an engine speed and actuator position is stored as a linear interpolation of multiple inlet air masses stored for different intake pipe pressures. Other models do not restrict the following observations.

For each such engine operating point and each intake pipe pressure, in a manner dependent on the exhaust system installed on the reference engine (=reference exhaust system) and the intake air temperature conditioning used, and under steady-state conditions, a reference intake pipe temperature $T_{air,im,ref}$ which is characteristic of the engine operating point, a reference exhaust manifold pressure $p_{im,ref}$ and a reference exhaust manifold temperature $T_{bg,em,ref}$ take effect. To be able to quantify the deviation of current engine operating conditions from the reference conditions, the following, also measured under reference conditions:

reference intake pipe temperature $T_{air,im,ref} = T_{air,im}(N_{eng}, p_{im}, s)|_{T_{0,ref}, p_{0,ref}}$ ((7))

reference exhaust manifold temperature $T_{bg,em,ref} = T_{bg,em}(N_{eng}, p_{im}, s)|_{T_{0,ref}, p_{0,ref}}$ ((8))

reference exhaust manifold pressure $p_{em,ref} = p_{em}(N_{eng}, p_{im}, s)|_{T_{0,ref}, p_{0,ref}}$ ((9))

are also stored in a model.

The exact modeling of the reference state of the engine is hereinafter assumed to be a given, and is not of importance for the approach discussed. The object of the approach described below is to describe the reduction or increase of the cylinder air mass $m_{air,cyl}$ caused by deviations of the gas states upstream of the inlet valve and downstream of the outlet valve from the reference state. Since the variation of the intake pipe pressure $p_{im}$ (=pressure upstream of the inlet valve) is already a part of the measurement of the reference engine and its influence is already described by the reference inlet air mass $m_{air,inv,ref}$ and the reference scavenging air mass $m_{air,scav,ref}$, the object is reduced to describing the reduction or increase of the cylinder air mass $m_{air,cyl}$ caused by deviations from the intake pipe temperature $T_{air,im}$, exhaust manifold pressure $p_{em}$ and exhaust manifold temperature $T_{bg,em}$ from the reference state.

An extension of the measurement of the reference engine to encompass a full variation of the influential variables intake pipe temperature $T_{air,im}$, exhaust manifold pressure $p_{em}$ and exhaust manifold temperature $T_{bg,em}$ is not practically possible. This would make it necessary 1. to lengthen the measurement several times over, 2. to perform the complete measurement on an extremely expensive and rare climate and altitude simulation test stand, and, 3. in so doing, to run through a full variation of all of the engine components which influence said three influential variables (for example exhaust system, turbocharger, intake path, charge-air cooler) and with which the engine type will potentially interact in different vehicles.

For this reason, the following approach is possible:— firstly, the cylinder air mass is determined under reference conditions from inlet air mass and scavenging air mass on the engine test stand, and the influence of the deviations of intake pipe temperature $T_{air,im}$, exhaust manifold pressure $p_{em}$ and exhaust manifold temperature $T_{bg,em}$ from the reference conditions is determined later on the basis of vehicle measurements during cold/heat/altitude tests and a small number of measurements on climate and/or altitude simulation test stands.

Corresponding to this temporal and organizational subdivision of the measurement, it is common, in the engine control unit, for the influence of intake pipe temperature $T_{air,im}$, exhaust manifold pressure $p_{em}$ and exhaust manifold temperature $T_{bg,em}$ on the model of the cylinder air mass to be configured as a correction which has a neutral effect (that is to say no effect) under reference conditions and the influence of which on the modeled cylinder air mass increases with increasing deviation from the reference conditions.

The following description offers potential approaches in a basic form:

1. a global approach which is based on a linearization of the model of the reference inlet air mass $m_{air,inv,ref}$ at the engine operating point and the correction of gradient and offset of said linearization in a manner dependent on intake pipe temperature $T_{air,im}$, exhaust manifold pressure $p_{em}$ and exhaust manifold temperature $T_{bg,em}$. This traditional approach is sufficient for engines without supercharging and for engines without large actuator adjustment ranges, but has proven to be too inaccurate in the case of supercharged engines with large valve overlap.

2. a local approach in which the data, stored in the engine control unit, of the reference inlet air mass $m_{air,inv,ref}$ can be corrected, in a data-intensive manner, individually in a manner dependent on intake pipe temperature $T_{air,im}$, exhaust manifold pressure $p_{em}$, exhaust manifold temperature $T_{bg,em}$ and actuator adjustments identified as being relevant, before the inlet air mass is interpolated for the current engine operating point. This approach adequately describes even supercharged engines with large valve overlap, but reaches the limits of the required accuracy if, using the same dataset of reference inlet air mass $m_{air,inv,ref}$, it is sought to describe the influence of other exhaust systems only with the aid of the corrections in a manner dependent on intake pipe temperature $T_{air,im}$, exhaust manifold pressure $p_{em}$ and exhaust manifold temperature $T_{bg,em}$.

Definition of the Overrun-Air Line

Figure 3:
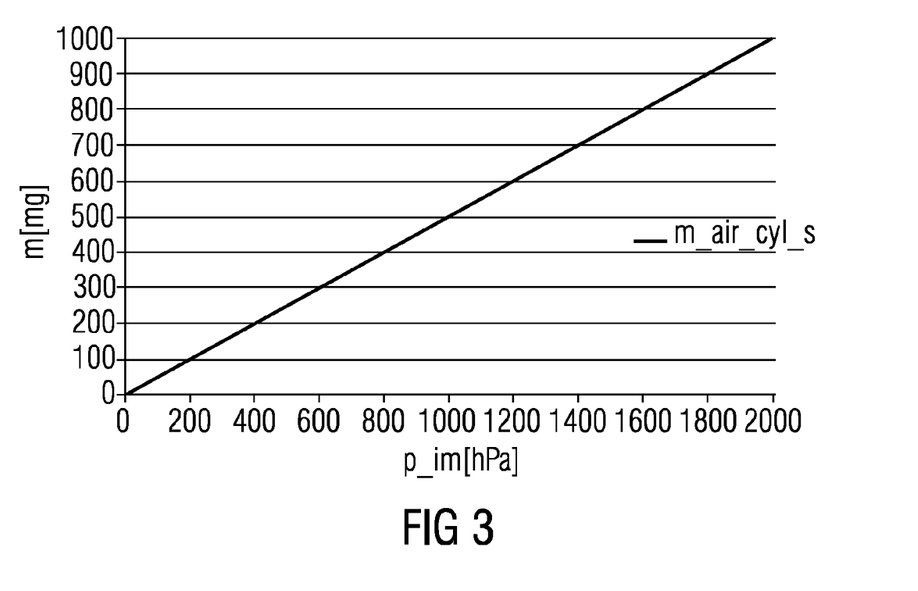
FIG. 3 shows an overrun-air straight line, according to teachings of the present disclosure.

For the separation of the effect of the displacement of fresh air by residual gas on the variable of cylinder air mass $m_{air,cyl}$ from other effects, the expression "overrun-air line" is defined: during the brief overrun operation of the hot engine under reference conditions without fuel injection and combustion, no combustion exhaust gas is generated, that is to say only air is situated in the cylinder at any point in time. The effects of the incomplete pressure equalization between intake pipe and cylinder and of the heat introduction from the hot cylinder wall into the air in the cylinder are very similar to those during fired operation. The cylinder air mass $m_{air,cyl,s}$ that is then enclosed in the cylinder (including the dead volume=cylinder volume at top dead center) upon the closure of the inlet valves is determined by the current cylinder volume $V_{cyl,InvClp}$ (including the dead volume=cylinder volume at top dead center), the current cylinder internal temperature $T_{air,cyl,InvClp,s}$ and the current cylinder pressure $p_{cyl,Inv,Clp,s}$ during overrun operation:

$$m_{air,cyl,s} = \frac{p_{cyl,InvClp,s} \cdot V_{cyl,InvClp}}{R_{air} \cdot T_{air,cyl,InvClp,s}}. \quad ((10))$$

The ratio between cylinder pressure and intake pipe pressure upon the closure of the inlet valve is determined in particular by the valve control, that is to say by whether the cylinder volume is still increasing in size, or has already decreased in size, upon the closure of the inlet valve. The cylinder pressure is approximated, for an engine speed and actuator position, as $$p_{cyl,InvClp,s} = c_1 p_{im}, \text{ where } c_1 = \text{const} \approx 1. \quad ((11))$$

The current cylinder volume upon the closure of the inlet valves is determined exclusively by the actuator positions, and thus not specifically for overrun operation. Thus, during overrun operation, for an engine speed/actuator position, the cylinder air mass $m_{air,cyl,s}$ is described by $$m_{air,cyl,s} = \frac{p_{cyl,InvClp,s} \cdot V_{cyl,InvClp}}{R_{air} \cdot T_{air,cyl,InvClp,s}} = \frac{c_1 \cdot V_{cyl,InvClp}}{R_{air}} \cdot \frac{p_{im}}{T_{air,cyl,InvClp,s}}, \quad ((12))$$

where $$\frac{c_1 \cdot V_{cyl,InvClp}}{R_{air}} = \text{const.}$$

Said function $m_{air,cyl,s} = f(p_{im}, T_{air,cyl,InvClp,s})$ will hereinafter be referred to as overrun-air line.

If, as a first approximation, the cylinder internal temperature is described, for an engine speed/actuator position, as $$T_{air,cyl,InvClp,s} = c_2 \cdot T_{air,im}, \text{ where } c_2 = \text{const} > 1 \quad ((13)),$$

it is the case in overrun operation, for an engine speed/actuator position, that the cylinder air mass $m_{air,cyl,s}$ is proportional to the intake pipe pressure:

$$m_{air,cyl,s} = \frac{c_1 \cdot V_{cyl,InvClp}}{R_{air}} \cdot \frac{p_{im}}{T_{air,cyl,InvClp,s}} = \frac{c_1 \cdot V_{cyl,InvClp}}{R_{air}} \cdot \frac{p_{im}}{c_2 \cdot T_{air,im}} = \frac{c_1 \cdot V_{cyl,InvClp}}{R_{air} \cdot c_2 \cdot T_{air,im}} \cdot p_{im} \quad ((14))$$

$$= \sigma_s(T_{air,im}) \cdot p_{im}$$

Said function $m_{air,cyl,s} = \sigma_s(T_{air,im}) \cdot p_{im}$, as a special case of the overrun-air line, will hereinafter be referred to as overrun-air straight line with the overrun gradient $\sigma_s$.

The density of the air in the cylinder upon the closure of the inlet valves during overrun operation is determined as $$\rho_{air,cyl,s,InvClp} = \frac{m_{air,cyl,s}}{V_{cyl,InvClp}} = \frac{c_1}{R_{air} \cdot c_2 \cdot T_{air,im}} \cdot p_{im} = \frac{\sigma_s(T_{air,im})}{V_{cyl,InvClp}} \cdot p_{im} \quad ((15))$$

A possible more precise approximation of the cylinder pressure which goes beyond equation ((11)), or a possible more precise approximation of the cylinder internal temperature which goes beyond equation ((13)), and a nonlinear overrun-air line that arises therefrom, do not restrict the following observations. Since the overrun-air line is expressly intended to describe the behavior of an engine which is overrunning but still at combustion temperature, it cannot be directly measured in a steady state. The parameterization of the linear overrun-air line will be described below. Residual gas model according to overrun-air line approach For an arbitrary engine speed/actuator position, the overrun-air line describes—with the exception of the displacement of air by the exhaust gas remaining in the cylinder from the proceeding working cycle (residual gas)—all of the above-described physical influences on the cylinder air mass $m_{air,cyl}$:

- the influence of the intake pipe pressure,
- the influence of the intake pipe temperature,
- the influence of an incomplete pressure equalization between intake pipe and cylinder,
- the introduction of heat into the air in the cylinder,
- the influence of the valve control on the current cylinder volume upon the closure of the inlet valves.

This yields the cylinder air mass $m_{air,cyl}$ as a difference between the cylinder air mass during brief overrun operation $m_{air,cyl,s}$ and the air mass displaced by residual gas (displaced air) $m_{air,dpl}$ $$m_{air,cyl} = m_{air,cyl,s} - m_{air,dpl} \quad ((16))$$

At engine operating points without scavenging $m_{air,scav} = 0$, equation ((2)) yields, for fired operation, $m_{air,cyl} = m_{air,inv}$.

Figure 4:
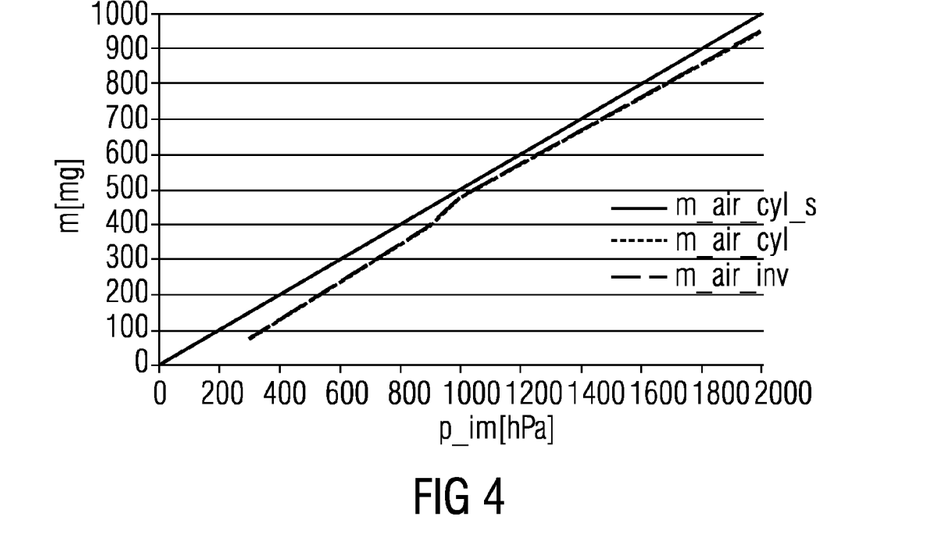
FIG. 4 shows a further overrun-air straight line, according to teachings of the present disclosure.

FIG. 4 shows a typical overrun-air straight line (cylinder air mass during brief overrun engine operation) $m_{air,cyl,s}$ and inlet air mass $m_{air,inv}$ = cylinder air mass $m_{air,cyl}$ at an engine operating point without scavenging.

At engine operating points with scavenging, the inlet air mass $m_{air,inv}$ is greater than the cylinder air mass $m_{air,cyl}$.

The cylinder air mass is, for said engine operating points, the minimum out of respective cylinder air during overrun operation $m_{air,cyl,s}$ and inlet air mass $m_{air,inv}$.

$$m_{air,cyl} = \min(m_{air,inv}, m_{air,cyl,s}) \qquad ((17))$$

Figure 5:
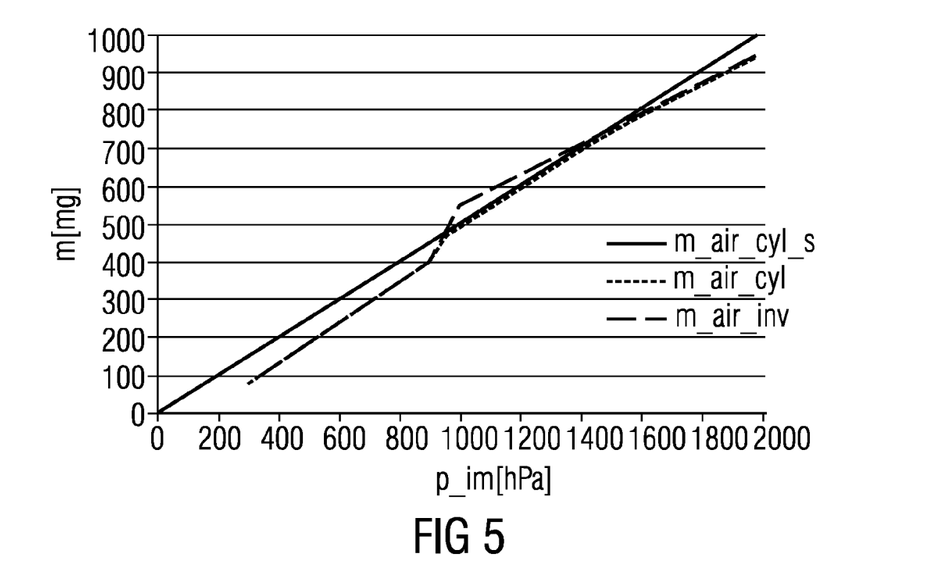
FIG. 5 shows a yet further overrun-air straight line, according to teachings of the present disclosure.

FIG. 5 shows a typical overrun-air straight line (cylinder air mass in brief overrun engine operation) $m_{air,cyl,s}$ and inlet air mass $m_{air,inv}$=cylinder air mass $m_{air,cyl}$ at an engine operating point with scavenging.

During fired operation, up until the closure of the gas inlet valve, a part of the cylinder volume is taken up, at equal pressure, by exhaust gas, and fresh air is displaced.

$$\frac{m_{air,dpl} \cdot R_{air} \cdot T_{air,cyl,InvClp}}{p_{cyl,InvClp}} = \qquad ((18))$$

$$\frac{m_{air,dpl}}{\rho_{air,cyl,dpl}} = V_{air,dpl} = \frac{m_{bg,cyl}}{\rho_{bg,cyl,InvClp}} = \frac{m_{bg,cyl} \cdot R_{bg} \cdot T_{bg,cyl,InvClp}}{p_{cyl,InvClp}},$$

where $R_{bg}$=specific gas constant of exhaust gas, which yields $$m_{air,dpl} = m_{bg,cyl} \cdot \frac{R_{bg} \cdot T_{bg,cyl,InvClp}}{R_{air} \cdot T_{air,cyl,InvClp}}. \qquad ((19))$$

Because, in a delimited volume with two spatially non-mixed gas packets of different density, the same pressure takes effect as in the case of arbitrary mixing of said gas packets, that is to say because the degree of mixing has no influence on the pressure in the volume, it can subsequently be assumed that, upon the closing of the inlet valve, the air in the cylinder is situated as a compact amount of gas at the same temperature as during the brief overrun engine operation, close to the inlet valve, whereas the exhaust gas in the cylinder (if present) is situated as a compact amount of gas close to the outlet valve.

$$T_{air,cyl,InvClp} = T_{air,cyl,InvClp,s} \qquad ((20))$$

Since this abstraction of the self-evidently present and desired mixing of air and exhaust gas in the cylinder does not change the cylinder pressure and thus the mass flows via the inlet and outlet valves, it may be used for the calculation of the air and exhaust-gas mass in the cylinder.

At engine operating points without valve overlap, upon the closure of the gas outlet valves (exhaust valve closure point—EXVCLP), exhaust gas at exhaust-gas manifold pressure $p_{cyl,ExvClp}=p_{em}$ and exhaust manifold temperature $T_{bg,cyl,ExvClp}=T_{bg,em}$ is enclosed in the cylinder. Disregarding the heat transfer between cylinder wall and exhaust gas, the exhaust gas is isentropically expanded/compressed by the piston movement until immediately before the opening of the gas inlet valves (inlet valve opening point—IVOP). Upon the opening of the gas inlet valves, the exhaust gas is expanded/compressed to the cylinder pressure upon the closure of the gas inlet valves $p_{cyl,InvClp}$, which is close to the intake pipe pressure. Said two isentropic changes in state can be described as an isentropic change in state with exhaust manifold pressure $p_{cyl,ExvClp}=p_{em}$ and exhaust manifold temperature $T_{bg,cyl,ExvClp}=T_{bg,em}$ in the initial state and cylinder pressure upon closure of the gas inlet valves $p_{cyl,InvClp}$.

At engine operating points with valve overlap, upon the opening of the gas inlet valves, the cylinders and exhaust manifold are charged with exhaust gas at exhaust manifold pressure $p_{cyl,ExvClp}=p_{em}$ and exhaust manifold temperature $T_{bg,cyl,ExvClp}=T_{bg,em}$. If, at the engine operating point, a pressure gradient arises between exhaust manifold and intake pipe $p_{im}<p_{em}$, then the exhaust gas expands during the valve overlap and flows in the direction of the intake pipe. If, at the engine operating point, a pressure gradient arises between intake pipe and exhaust manifold $p_{im}>p_{em}$, the exhaust gas is compressed during the valve overlap and flows in the direction of the exhaust manifold. In the extreme case of scavenging, the exhaust gas is scavenged out entirely. Disregarding the heat transfer between cylinder wall and exhaust gas, said change in state can also be regarded as an isentropic change in state with exhaust manifold pressure $p_{cyl,ExvClp}=p_{em}$ and exhaust manifold temperature $T_{bg,cyl,ExvClp}=T_{bg,em}$ in the initial state and cylinder pressure upon closure of the inlet valves $p_{cyl,InvClp}$. The exhaust-gas mass that undergoes this change in state varies, depending on pressure conditions, to a very much greater extent than without valve overlap.

For the isentropic change in state, the following applies:

$$\frac{T_{bg,cyl,InvClp}}{T_{bg,em}} = \left(\frac{p_{cyl,InvClp}}{p_{em}}\right)^{\frac{\kappa_{bg}-1}{\kappa_{bg}}}, \qquad ((21))$$

where $\kappa_{bg}$ = isentropic exponent of exhaust gas, , which yields $$T_{bg,cyl,InvClp} = T_{bg,em} \cdot \left(\frac{p_{cyl,InvClp}}{p_{em}}\right)^{\frac{\kappa_{bg}-1}{\kappa_{bg}}}. \qquad ((22))$$

Inserting ((20)) and ((22)) into ((19)), the air mass displaced by exhaust gas (displaced air) $m_{air,dpl}$ is determined as:

$$m_{air,dpl} = m_{bg,cyl} \cdot \frac{R_{bg} \cdot T_{bg,cyl,InvClp}}{R_{air} \cdot T_{air,cyl,InvClp,s}} = \qquad ((23))$$

$$m_{bg,cyl} \cdot \frac{R_{bg} \cdot T_{bg,em} \cdot \left(\frac{p_{cyl,InvClp}}{p_{em}}\right)^{\frac{\kappa_{bg}-1}{\kappa_{bg}}}}{R_{air} \cdot T_{air,cyl,InvClp,s}}.$$

Inserting ((23)) into ((16)) yields $$m_{air,cyl} = m_{air,cyl,s} - m_{bg,cyl} \cdot \frac{R_{bg} \cdot T_{bg,em}}{R_{air} \cdot T_{air,cyl,InvClp,s}} \cdot \left(\frac{p_{cyl,InvClp}}{p_{em}}\right)^{\frac{\kappa_{bg}-1}{\kappa_{bg}}}. \qquad ((24))$$

Assuming the linear models ((10)) and ((13)), ((24)) yields $$m_{air,cyl} = m_{air,cyl,s} - m_{bg,cyl} \cdot \frac{R_{bg} \cdot T_{bg,em}}{R_{air} \cdot c_2 \cdot T_{air,im}} \cdot \left(\frac{c_1 \cdot p_{im}}{p_{em}}\right)^{\frac{\kappa_{bg}-1}{\kappa_{bg}}}, \qquad ((25))$$

-continued $$m_{air,cyl} = m_{air,cyl,s} - m_{bg,cyl} \cdot \frac{R_{bg} \cdot T_{bg,em}}{R_{air} \cdot T_{air,im}} \cdot \left(\frac{p_{im}}{p_{em}}\right)^{\frac{\kappa_{bg}-1}{\kappa_{bg}}} \cdot c_3, \quad ((26))$$

where $$c_3 = \frac{c_1^{\frac{\kappa_{bg}-1}{\kappa_{bg}}}}{c_2} \approx 1,$$

or simplified:

$$m_{air,cyl} = m_{air,cyl,s} - m_{bg,cyl} \cdot \frac{R_{bg} \cdot T_{bg,em}}{R_{air} \cdot T_{air,im}} \cdot \left(\frac{p_{im}}{p_{em}}\right)^{\frac{\kappa_{bg}-1}{\kappa_{bg}}}. \quad ((27))$$

Assuming the models ((2)) and ((14)), ((27)) yields:

$$m_{air,cyl} = m_{air,inv} - m_{air,scav} \quad ((28))$$

$$= \sigma_s \cdot p_{im} - m_{bg,cyl} \cdot \frac{R_{bg} \cdot T_{bg,em}}{R_{air} \cdot T_{air,im}} \cdot \left(\frac{p_{im}}{p_{em}}\right)^{\frac{\kappa_{bg}-1}{\kappa_{bg}}}.$$

Assuming a known overrun gradient $\sigma_s$ (for the derivation thereof, see below), equation ((28)) can, by inserting equation ((2)), be rearranged to calculate the exhaust-gas mass $m_{bg,cyl}$ enclosed in the cylinder (residual gas mass):

$$m_{bg,cyl} = m_{bg,cyl,SSL} = \quad ((29))$$
$$(\sigma_s \cdot p_{im} - (m_{air,inv} - m_{air,scav})) \cdot \frac{R_{air} \cdot T_{air,im}}{R_{bg} \cdot T_{bg,em}} \cdot \left(\frac{p_{em}}{p_{im}}\right)^{\frac{\kappa_{bg}-1}{\kappa_{bg}}}$$

Equation ((29)) will hereinafter be referred to as residual gas model according to overrun-air line approach ("OAL" approach).

Cylinder Air Mass Model According to Overrun-Air Line Approach

Equation ((29)) describes the exhaust-gas mass $m_{bg,cyl}$ enclosed in the cylinder (residual gas mass) generally for any engine operating point, specifically also for an arbitrary engine speed/actuator position under reference conditions:

$$m_{bg,cyl,ref,SSL} = (\sigma_{s,ref} \cdot p_{im,ref} - (m_{air,inv,ref} - m_{air,scav,ref})) \cdot \quad ((30))$$
$$\frac{R_{air} \cdot T_{air,im,ref}}{R_{bg} \cdot T_{bg,em,ref}} \cdot \left(\frac{p_{em,ref}}{p_{im,ref}}\right)^{\frac{\kappa_{bg}-1}{\kappa_{bg}}},$$

where
the reference inlet air mass $m_{air,inv,ref}$ is stored in the engine control unit in a model according to equation ((5)),
the reference scavenging air mass $m_{air,scav,ref}$ is stored in the engine control unit in a model according to equation ((6)),
the reference intake pipe temperature $T_{air,im,ref}$ is stored in the engine control unit in a model according to equation ((7)),
the reference exhaust manifold temperature $T_{bg,em,ref}$ is stored in the engine control unit in a model according to equation ((8)), and
the reference exhaust manifold pressure $p_{im,ref}$ is stored in the engine control unit in a model according to equation ((9)).

For the determination of the residual gas mass under reference conditions at intake pipe pressure $p_{im}$, the overrun gradient $\sigma_s$, ref under reference conditions (for the derivation thereof, see below) is still missing.

Equation ((28)) describes the cylinder air mass $m_{air,cyl}$ in general for any engine operating point, specifically also for the same engine speed/actuator position under arbitrary current conditions:

$$m_{air,cyl,cur} = m_{air,inv,cur} - m_{air,scav,cur} \quad ((31))$$
$$= \sigma_{s,cur} \cdot p_{im,cur} - m_{bg,cyl,cur} \cdot \frac{R_{bg} \cdot T_{bg,em,cur}}{R_{air} \cdot T_{air,im,cur}} \cdot \left(\frac{p_{im,cur}}{p_{em,cur}}\right)^{\frac{\kappa_{bg}-1}{\kappa_{bg}}},$$

where
the current intake pipe temperature $T_{air,im,cur}$,
the current exhaust manifold temperature $T_{bg,em,cur}$ and
the current exhaust manifold pressure $p_{em,cur}$
are measured/modeled in the control unit on an ongoing basis, that is to say are known. The reference intake pipe pressure $p_{im,ref}$ for the comparison with the current intake pipe pressure $p_{im,cur}$ may be freely selected, because the reference models describe the engine behavior for any intake pipe pressure. Therefore, for the intake pipe pressure, it is not necessary to distinguish between reference and current conditions, and therefore $$p_{im} = p_{im,cur} = p_{im,ref} \quad ((32))$$

Assuming a known overrun gradient $\sigma_{s,cur}$ under current conditions (for the derivation thereof, see below), the cylinder air mass under current conditions $m_{air,cyl,cur}$ can be calculated as:

$$m_{air,cyl,cur} = \sigma_{s,cur} \cdot p_{im} - m_{bg,cyl,cur} \cdot \frac{R_{bg} \cdot T_{bg,em,cur}}{R_{air} \cdot T_{air,im,cur}} \cdot \left(\frac{p_{im}}{p_{em,cur}}\right)^{\frac{\kappa_{bg}-1}{\kappa_{bg}}}. \quad ((33))$$

The model described by equation ((33)) will hereinafter be referred to as cylinder air mass model according to overrun-air line approach ("OAL" approach).

Thus, for the determination of the cylinder air mass under current conditions $m_{air,cyl,cur}$, the overrun gradient $\sigma_{s,cur}$ and the residual gas mass $m_{bg,cyl,cur}$ under current conditions are still missing.

It follows from this that, to calculate the cylinder air mass $m_{air,cyl,cur}$ under current conditions, it is necessary to determine
the overrun gradient under reference conditions $\sigma_{s,ref}$,
the overrun gradient under current conditions $\sigma_{s,cur}$, and
the change in the residual gas mass from reference conditions to current conditions:

$$m_{bg,cyl,cur} = f(p_{im}, m_{bg,cyl,ref}, p_{em,ref}, p_{em,cur}, T_{em,ref}, T_{em,cur}, T_{im,ref}, T_{im,cur}) \quad ((34)).$$

Expansion of the FVV Residual Gas Model

The Research Association for Combustion Engines (Forschungsvereinigung Verbrennungskraftmaschinen, FVV), in its proposal no. 740 "Development of a generally applicable residual gas model for internal combustion engines" (2002), developed a residual gas model, hereinafter referred to as FVV residual gas model. In the concluding report (pages 61-65), the residual gas mass $m_{bg,cyl,FVV}$ of an internal combustion engine
with stoichiometric fuel/air mixture,
without influence of the fuel quantity on the cylinder air mass, that is to say with direct injection,
at an operating point with valve overlap and
at an operating point without scavenging,
and converted into the nomenclature hitherto used here, is specified as the sum:

$$m_{bg,cyl,FVV} = m_{bg,cyl,InvOpp} + \Delta m_{bg,cyl,\Delta V} + \Delta m_{bg,cyl,\Delta p} \quad ((35)),$$

where Opp means opening point,
the exhaust-gas mass situated in the cylinder upon the opening of the inlet valves:

$$m_{bg,cyl,InvOpp} = \rho_{bg,em} \cdot V_{cyl,InvOpp} = \frac{p_{em} \cdot V_{cyl,InvOpp}}{R_{bg} \cdot T_{bg,em}}, \quad ((36))$$

where $V_{cyl,InvOpp}$=cylinder volume upon opening of the inlet valves,
the exhaust-gas mass effectively drawn into the cylinder from the exhaust manifold by the piston movement during the valve overlap owing to the change in cylinder volume ($\Delta V$) (in the case of an effective discharge of exhaust gas with negative value):

$$\Delta m_{bg,cyl,\Delta V} = \rho_{bg,em} \cdot \underbrace{\int_{\varphi=\varphi_{InvOpp}}^{\varphi_{ExhClp}} \left[ \frac{dV}{d\varphi} \cdot \frac{(A_{Exv}(\varphi))^2}{(A_{Exv}(\varphi))^2 + (A_{Inv}(\varphi))^2} d\varphi \right]}_{K_1} \quad ((37))$$

$$= \rho_{bg,em} \cdot K_1,$$

where $\varphi$=current crank angle, $\varphi_{InvOpp}$=crank angle upon opening of the inlet valves, $\varphi_{ExvClp}$=crank angle upon closure of the outlet valves, $V$=current cylinder volume, $A_{Inv}(\varphi)$=currently effective opening cross section of the inlet valves, $A_{Exv}(\varphi)$=currently effective opening cross section of the outlet valves, $\omega$=angular speed of the crankshaft,
the exhaust-gas mass scavenged back into the cylinder and possibly into the intake pipe during the valve overlap owing to the pressure gradient ($\Delta p$) from exhaust manifold pressure to intake pipe pressure:

$$\Delta m_{bg,cyl,\Delta p} = SGN(p_{em} - p_{im}) \cdot \sqrt{2 \cdot \rho_{bg,em} \cdot |p_{em} - p_{im}|} \cdot \quad ((38))$$

$$\frac{dt}{\varphi} \underbrace{\int_{\varphi=\varphi_{InvOpp}}^{\varphi_{ExvClp}} \left[ \frac{dV}{d\varphi} \cdot \frac{A_{Inv}(\varphi) \cdot A_{Exv}(\varphi)}{\sqrt{(A_{Exv}(\varphi))^2 + (A_{Inv}(\varphi))^2}} d\varphi \right]}_{K_2}$$

$$= SGN(p_{em} - p_{im}) \cdot \sqrt{2 \cdot \rho_{bg,em} \cdot |p_{em} - p_{im}|} \cdot \frac{K_2}{\omega},$$

where $\omega$=angular speed of the crankshaft.

For the derivation of the equations ((35-38)), reference is made to the concluding report of the FVV proposal no. 740 "Development of a generally applicable residual gas model for internal combustion engines" (2002), the content of which in this regard is hereby incorporated.

For a particular engine speed and actuator position, $\varphi_{InvOpp}$=crank angle upon opening of the gas inlet valves, $\varphi_{ExvClp}$=crank angle upon closure of the gas outlet valves, $V_{cyl,InvOpp}$=cylinder volume upon the opening of the inlet valves, $A_{Inv}(\varphi)$=currently effective opening cross section of the gas inlet valves, and $A_{Exv}(\varphi)$=currently effective opening cross section of the gas outlet valves, and thus the constants $K_1$ and $K_2$, are defined.

For engine operating points with a pressure gradient from the exhaust manifold to the intake pipe $p_{im} < p_{em}$, equation ((38)) describes the exhaust-gas mass flow in the direction of the intake pipe during the valve overlap:

$$\Delta m_{bg,cyl,\Delta p} = \sqrt{2 \cdot \rho_{bg,em} \cdot (p_{em} - p_{im})} \cdot \frac{K_1}{\omega} \quad ((39))$$

For engine operating points with a pressure gradient from the intake pipe to the exhaust manifold $p_{im} > p_{em}$, equation ((38)) describes the exhaust-gas mass flow in the direction of the exhaust manifold during the valve overlap as a negative value:

$$\Delta m_{bg,cyl,\Delta p} = -\sqrt{2 \cdot \rho_{bg,em} \cdot (p_{im} - p_{em})} \cdot \frac{K_1}{\omega} \quad ((40))$$

An increasing intake pipe pressure $p_{im}$ and thus an increasing pressure gradient from the intake pipe to the exhaust manifold $p_{im} > p_{em}$ increases the exhaust-gas mass flow in the direction of the exhaust manifold during the valve overlap according to equation ((40)), without having a great influence on the exhaust-gas mass situated in the cylinder upon the opening of the gas inlet valves, according to equation ((36)), or the exhaust-gas mass effectively drawn into the cylinder from the exhaust manifold by the piston movement during the valve overlap, according to equation ((37)). The limit case of equation ((35))=0:

$$m_{bg,cyl,FVV} = m_{bg,cyl,InvOpp} + \Delta m_{bg,cyl,\Delta V} + \Delta m_{bg,cyl,\Delta p} = 0 \quad ((41))$$

describes the state in which the residual gas is fully scavenged out into the exhaust manifold by the air, without air being scavenged through into the exhaust manifold.

If air is scavenged through into the exhaust manifold, equation ((35)) yields a physically nonsensical negative residual gas mass $m_{bg,cyl,FVV} = m_{bg,cyl,InvOpp} + \Delta m_{bg,cyl,\Delta V} + \Delta m_{bg,cyl,\Delta p} < 0$. According to the prerequisites, the residual gas (exhaust gas), during the overlap, is always in the same gas state as the exhaust gas in the exhaust manifold, and thus has the density $$\rho_{bg,em} = \frac{m_{bg}}{V_{bg}} = \frac{p_{em}}{R_{bg} \cdot T_{bg,em}} \quad ((42))$$

and thus the volume $$V_{bg} = \frac{m_{bg,em}}{\rho_{bg}} = \frac{m_{bg} \cdot R_{bg} \cdot T_{bg,em}}{p_{em}} = \quad ((43))$$

$$-(m_{bg,cyl,InvOpp} + \Delta m_{bg,cyl,\Delta V} + \Delta m_{bg,cyl,\Delta p}) \cdot \frac{R_{bg} \cdot T_{bg,em}}{p_{em}}.$$

This "absent" residual gas volume can be interpreted as the volume of the scavenging air that has been scavenged through into the exhaust manifold.

If the scavenging air is regarded as a gas packet which is situated in the exhaust manifold and which has not mixed with the exhaust gas, then, during the scavenging-through process, although it assumes the exhaust manifold pressure $p_{em}$, it does not assume the high temperature of the exhaust gas in the exhaust manifold $T_{bg,em}$. The temperature of said scavenging air can be described as being equal to the air temperature in the cylinder in the case of brief overrun operation according to equation ((13)).

$$T_{air,scav} = T_{air,cyl,InvClp,s} = c_2 \cdot T_{air,im}, \text{ where } c_2 = \text{const} > 1 \quad ((44)),$$

simplified with $c_2 = 1$:

$$T_{air,scav} = T_{air,im} \quad ((45))$$

The scavenging air thus has the density $$\rho_{air,scav} = \frac{m_{air,scav}}{V_{air,scav}} = \frac{p_{em}}{R_{air} \cdot T_{air,scav}} = \frac{p_{em}}{R_{air} \cdot T_{air,cyl,InvClp,s}} \quad ((46))$$

and thus the volume $$V_{air,scav} = \frac{m_{air,scav}}{\rho_{air,scav}} = \frac{m_{air,scav} \cdot R_{air} \cdot T_{air,cyl,InvClp,s}}{p_{em}}. \quad ((47))$$

Equating the volumes from equation ((43)) and ((47)) yields:

$$m_{air,scav,FVV} = \quad ((48))$$
$$-(m_{bg,cyl,InvOpp} + \Delta m_{bg,cyl,\Delta V} + \Delta m_{bg,cyl,\Delta p}) \cdot \frac{R_{bg} \cdot T_{bg,em}}{R_{air} \cdot T_{air,cyl,InvClp,s}}$$

In summary, equation ((35)) as a description of the residual gas mass is restricted to positive values:

$$m_{bg,cyl,FVV} = F(p_{im}, p_{em}, T_{bg,em}) \quad ((49))$$
$$= \max(0, m_{bg,cyl,InvOpp} + \Delta m_{bg,cyl,\Delta V} + \Delta m_{bg,cyl,\Delta p}),$$

and negative values of equation ((35)) describe the occurrence of scavenging with a scavenging air mass, according to equation ((48)):

$$m_{air,scav,FVV} = G(p_{im}, p_{em}, T_{air,im}, T_{bg,em}) \quad ((50))$$
$$= \max(0, -(m_{bg,cyl,InvOpp} + \Delta m_{bg,cyl,\Delta V} + \Delta m_{bg,cyl,\Delta p})) \cdot$$
$$\frac{R_{bg} \cdot T_{bg,em}}{R_{air} \cdot T_{air,cyl,InvClp,s}}$$

The model described by equation ((49)) will hereinafter be referred to as expanded residual gas model according to FVV approach. The model described by equation ((50)) will hereinafter be referred to as scavenging air mass model according to FVV approach.

Scaling of the Models

The models of the reference inlet air mass $m_{air,inv,ref}$ according to equation ((5)) and of the reference scavenging air mass $m_{air,scav,ref}$ according to equation ((6)) can, through the selection of the structure and the scope of the data of said models, be aligned with any desired accuracy to the measurement values available under reference conditions. The cylinder air mass model based thereon according to the OAL approach, equation ((33)), describes the reference cylinder air mass $m_{air,cyl,ref}$ accurately. This is an advantage of the OAL approach. The cylinder air mass model according to the OAL approach is however inadequate in describing the change in the residual gas mass from reference conditions to current conditions $m_{bg,cyl,cur} = f(p_{im}, m_{bg,cyl,ref}, p_{em,ref}, p_{em,cur}, T_{em,ref}, T_{em,cur}, T_{im,ref}, T_{im,cur})$ according to equation ((34)), and thus the cylinder air mass $m_{air,cyl,cur}$ under current conditions which differ from the reference conditions; →disadvantage of the OAL approach.

The expanded FVV residual gas and scavenging air mass model physically correctly reflects the character of the influence of variable ambient conditions on the residual gas and scavenging air mass, that is to say ittendentially correctly models the occurring monotonicities and intensifications. This is an advantage of the FVV approach.

Owing to the simplifications made during the derivation, it is however less accurate, for arbitrarily selected reference conditions, in particular for conditions that prevail on the engine test stand during engine measurement, than models of the reference inlet air mass $m_{air,inv,ref}$ according to equation ((5)) and of the reference scavenging air mass $m_{air,scav,ref}$ according to equation ((6)). This is a disadvantage of the FVV approach.

The expanded FVV residual gas model ((49)) describes the residual gas mass at an engine operating point, in a manner dependent on the ambient conditions intake pipe pressure $p_{im}$, exhaust manifold pressure $p_{em}$, exhaust manifold temperature $T_{bg,em}$ and exhaust manifold pressure $p_{em}$, as $m_{bg,cyl,FVV} = F(p_{im}, p_{em}, T_{bg,em})$.

Analogously to equation ((30)) according to the OAL approach, the residual gas mass of the engine under reference conditions according to the FVV approach, equation ((49)), can be written as $$m_{bg,cyl,ref,FVV} = F(p_{im}, p_{em,ref}, T_{bg,em,ref}) \quad ((51)).$$

Analogously to equation ((51)), the residual gas mass of the engine under current conditions according to the FVV approach, equation ((49)), can be written as $$m_{bg,cyl,cur,FVV} = F(p_{im}, p_{em,cur}, T_{bg,em,rcur}) \quad ((52)).$$

Thus, the change in the residual gas mass from reference conditions to current conditions, described abstractly in equation ((34)), can be expressed as $$m_{bg,cyl,cur,SSSL} = f(p_{im}, m_{bg,cyl,ref,SSL}, p_{em,ref}, p_{em,cur}, T_{em,ref}, \quad ((53))$$
$$T_{em,cur}, T_{im,ref}, T_{im,cur})$$
$$= m_{bg,cyl,ref,SSL} + (m_{bg,cyl,cur,FVV} - m_{bg,cyl,ref,FVV})$$

The FVV residual gas model provides a correction for the OAL residual gas model. The model described by equation ((53)) will hereinafter be referred to as residual gas mass module according to the scaled overrun-air line approach ("SOAL" approach). Inserting ((30,53)) into ((33)) yields:

$$m_{bg,cyl,ref,SSL} = (\sigma_{s,ref} \cdot p_{im,ref} - (m_{air,inv,ref} - m_{air,scav,ref})) \cdot \quad ((54))$$
$$\frac{R_{air} \cdot T_{air,im,ref}}{R_{bg} \cdot T_{bg,em,ref}} \cdot \left(\frac{p_{em,ref}}{p_{im,ref}}\right)^{\frac{\kappa_{bg}-1}{\kappa_{bg}}}$$

-continued $$m_{bg,cyl,cur,SSSL} = m_{bg,cyl,ref,SSL} + (m_{bg,cyl,cur,FVV} - m_{bg,cyl,ref,FVV})$$

$$m_{air,cyl,cur,SSSL} = $$
$$\sigma_{s,cur} \cdot p_{im} - m_{bg,cyl,cur,SSSL} \cdot \frac{R_{bg} \cdot T_{bg,em,cur}}{R_{air} \cdot T_{air,im,cur}} \cdot \left(\frac{p_{im}}{p_{em,cur}}\right)^{\frac{\kappa_{bg}-1}{\kappa_{bg}}},.$$

The model described by equation ((54)) will hereinafter be referred to as cylinder air mass model according to the scaled overrun-air line approach ("SOAL" approach).

It combines the advantages of the OAL and FVV approaches:
  Close to the reference conditions, the accuracy of the cylinder air mass $m_{air,cyl,cur}$ is determined by the reference inlet air mass $m_{air,inv,ref}$ and the reference scavenging air mass $m_{air,scav,ref}$ since the correction of the residual gas mass $m_{bg,cyl,cur,FVV} - m_{bg,cyl,ref,FVV}$ is small.
  In the case of relatively great deviations from the reference conditions, it physically correctly models the character of the influence of variable ambient conditions on the cylinder air mass $m_{air,cyl,cur}$—that is to say the occurring monotonicities and intensifications are reflected.

The Determination of the Overrun Gradient

Until now, the value of the overrun gradient $\sigma_s$ for the respective engine operating point has always been assumed as being known. It should be determined, without further calibration data, from the models, stored for the respective engine operating point, of
  reference inlet air mass according to equation ((5)),
  reference scavenging air mass according to equation ((6)), and
  the intake pipe temperature, exhaust manifold temperature and exhaust manifold pressure, which describe the reference state, according to equations ((7-9)).

For every engine speed/actuator position, to be able to calculate the overrun gradient $\sigma_s$, it suffices, for an intake pipe pressure $p_{im}$, to know the air mass $m_{air,dpl}$ displaced by residual gas, said air mass being proportional to the residual gas mass $m_{bg,cyl}$. The error in the calculation is minimal if the residual gas is the least possible for said intake pipe pressure. The residual gas mass is minimal
  for engine speed/actuator positions in which scavenging occurs, specifically at those intake pipe pressures $p_{im}$ slightly above ambient pressure at which scavenging occurs. The residual gas mass is then $m_{bg,cyl}=0$.
  for engine speed/actuator positions in which no scavenging occurs, at those intake pipe pressures $p_{im}$ slightly above ambient pressure at which a pressure gradient from the intake pipe to the exhaust manifold, $p_{im} > p_{em}$, prevails, or at the least, the pressure gradient from the exhaust manifold to the intake pipe, $p_{em} > p_{im}$, is as small as possible.

Said overrun gradient intake pipe pressure $p_{im,o}$, at which the overrun gradient $\sigma_s$ is determined can be selected globally relative to the respective ambient pressure $p_0$:

$$p_{im,o_s} = c_3 \cdot p_0, \text{ where } c_3 \in [1 \ldots 1,5], \text{global constant} \quad ((55))$$

For this overrun gradient intake pipe pressure $p_{im,o_s}$, the residual gas mass according to the expanded FVV residual gas model, equation ((49)), is determined as $$m_{bg,cyl,FVV}(p_{im,o_s}, p_{em}, T_{bg,em}) = \max(0, m_{bg,cyl,InvOpp} + \Delta_{bg,cyl,\Delta V} + \Delta m_{bg,cyl,\Delta p}) \quad ((56))$$

Specifically, said residual gas mass according to the expanded FVV residual gas model according to equation ((56)) applies for reference conditions:

$$m_{bg,cyl,FVV,ref}(p_{im,\sigma_s,ref}, p_{em,ref}, T_{bg,em,ref}) = \quad ((57))$$
$$\max\left(0, \begin{array}{l} m_{bg,cyl,InvOpp}(p_{im,\sigma_s,ref}, p_{em,ref}, T_{bg,em,ref}) + \\ \Delta m_{bg,cyl,\Delta V}(p_{im,\sigma_s,ref}, p_{em,ref}, T_{bg,em,ref}) + \\ \Delta m_{bg,cyl,\Delta p}(p_{im,\sigma_s,ref}, p_{em,ref}, T_{bg,em,ref}) \end{array}\right)$$

and for current conditions:

$$m_{bg,cyl,FVV,cur}(p_{im,\sigma_s,cur}, p_{em,cur}, T_{bg,em,cur}) = \quad ((58))$$
$$\max\left(0, \begin{array}{l} m_{bg,cyl,InvOpp}(p_{im,\sigma_s,cur}, p_{em,cr}, T_{bg,em,cur}) + \\ \Delta m_{bg,cyl,\Delta V}(p_{im,\sigma_s,cur}, p_{em,cur}, T_{bg,em,cur}) + \\ \Delta m_{bg,cyl,\Delta p}(p_{im,\sigma_s,cur}, p_{em,cur}, T_{bg,em,cur}) \end{array}\right)$$

For the reference conditions that prevail during measurement of the engine on the engine test stand, the reference overrun gradient $\sigma_{s,ref}$ emerges from the stored models for reference inlet air mass according to equation ((5)), reference scavenging air mass according to equation ((6)) and reference intake pipe temperature according to equation ((7)).

Equation ((27)) describes the cylinder air mass during the brief overrun engine operation in a generally valid manner as $$m_{air,cyl,s} = m_{air,cyl} + m_{bg,cyl} \cdot \frac{R_{bg} \cdot T_{bg,em}}{R_{air} \cdot T_{air,im}} \cdot \left(\frac{p_{im}}{p_{em}}\right)^{\frac{\kappa_{bg}-1}{\kappa_{bg}}}. \quad ((59))$$

Specifically, under reference conditions, for the overrun gradient intake pipe pressure $p_{im,o_s,ref} = c_3 \cdot p_{0,ref}$, the following applies:

$$m_{air,cyl,s,ref}(p_{im,\varpi_s,ref}) = m_{air,cyl,ref}(p_{im,\varpi_s,ref}) + \quad ((60))$$
$$m_{bg,cyl,ref,FVV}(p_{im,\varpi_s,ref}) \cdot \frac{R_{bg} \cdot T_{bg,em,ref}}{R_{air} \cdot T_{air,im,ref}} \cdot \left(\frac{p_{im,\varpi_s,ref}}{p_{em,ref}}\right)^{\frac{\kappa_{bg}-1}{\kappa_{bg}}}.$$

At operating points with scavenging under reference conditions, according to equation ((2)), the following applies:

$$m_{air,cyl,ref} = m_{air,inv,ref} - m_{air,scav,ref} \quad ((61)),$$

and no residual gas is generated $m_{bg,cyl,ref,FVV}(p_{im,\varpi_s,ref})=0$. This yields, for scavenging operating points under reference conditions, ((61))→((60)):

$$m_{air,cyl,s,ref}(p_{im,\varpi_s,ref}) = m_{air,inv,ref}(p_{im,\varpi_s,ref}) - m_{air,scav,ref}(p_{im,\varpi_s,ref}) \quad ((62))$$

((62)).

At operating points without scavenging, under reference conditions, residual gas is generated, and according to equation ((17)), the following applies:

$$m_{air,cyl,ref} = \min(m_{air,inv,ref}, m_{air,cyl,s,ref}) = m_{air,inv,ref} \quad ((63)).$$

This yields, for operating points without scavenging under reference conditions, ((63))→((60)):

$$m_{air,cyl,s,ref}(p_{im,\varpi_s,ref}) = m_{air,inv,ref}(p_{im,\varpi_s,ref}) + \qquad ((64))$$
$$m_{bg,cyl,ref,FVV}(p_{im,\varpi_s,ref}) \cdot \frac{R_{bg} \cdot T_{bg,em,ref}}{R_{air} \cdot T_{air,im,ref}} \cdot \left(\frac{p_{im,\varpi_s,ref}}{p_{em,ref}}\right)^{\frac{\kappa_{bg}-1}{\kappa_{bg}}}$$

Since the residual gas mass and scavenging air mass are never simultaneously >0, equations ((62)) and ((64)) for operating points with and without scavenging can be combined to give:

$$m_{air,cyl,s,ref}(p_{im,\varpi_s,ref}) = \qquad ((65))$$
$$m_{air,inv,ref}(p_{im,\varpi_s,ref}) - m_{air,scav,ref}(p_{im,\varpi_s,ref}) +$$
$$m_{bg,cyl,ref,FVV}(p_{im,\varpi_s,ref}) \cdot \frac{R_{bg} \cdot T_{bg,em,ref}}{R_{air} \cdot T_{air,im,ref}} \cdot \left(\frac{p_{im,\varpi_s,ref}}{p_{em,ref}}\right)^{\frac{\kappa_{bg}-1}{\kappa_{bg}}}$$

For the overrun gradient under reference conditions, equation ((14)) yields:

$$\sigma_{s,ref} = \frac{m_{air,cyl,s,ref}(p_{im,\varpi_s,ref})}{p_{im,\sigma_s,ref}} \qquad ((66))$$

$$= \frac{m_{air,inv,ref}(p_{im,\varpi_s,ref}) - m_{air,scav,ref}(p_{im,\varpi_s,ref}) + m_{bg,cyl,ref,FVV}(p_{im,\varpi_s,ref}) \cdot \frac{R_{bg} \cdot T_{bg,em,ref}}{R_{air} \cdot T_{air,im,ref}} \cdot \left(\frac{p_{im,\varpi_s,ref}}{p_{em,ref}}\right)^{\frac{\kappa_{bg}-1}{\kappa_{bg}}}}{p_{im,\sigma_s,ref}},$$

where $m_{air,inv,ref}(p_{im,o_s,ref})$=reference inlet air mass according to equation ((5)), $m_{air,scav,ref}(p_{im,o_s,ref})$=reference scavenging air mass according to equation ((6)), $m_{bg,cyl,ref,FVV}(p_{im,\varpi_s,ref})$=reference residual gas mass according to equation ((56)).

Equation ((66)) describes the overrun gradient under reference conditions, that is to say at $T_{air,im,ref}$. According to equation ((14)), the overrun gradient for an engine speed/actuator position is indirectly proportional to the intake pipe temperature $T_{air,im}$:

$$\sigma_s \cdot T_{air,im} = \frac{c_1 \cdot V_{cyl,InvClp}}{c_2 \cdot R_{air}} = \text{const} \qquad ((67))$$

This applies both for reference conditions and for any current conditions:

$$\sigma_{s,ref} \cdot T_{air,im,ref} = \frac{c_1 \cdot V_{cyl,InvClp}}{c_2 \cdot R_{air}} = \sigma_{s,cur} \cdot T_{air,im,cur}, \qquad ((68))$$

which yields $$\sigma_{s,cur} = \sigma_{s,ref} \cdot \frac{T_{air,im,ref}}{T_{air,im,cur}} \qquad ((69))$$

Inserting ((66))→((69)) yields:

$$m_{air,cyl,s,ref}(p_{im,\varpi_s,ref}) = \qquad ((70))$$
$$m_{air,inv,ref}(p_{im,\varpi_s,ref}) - m_{air,scav,ref}(p_{im,\varpi_s,ref}) +$$
$$m_{bg,cyl,ref,FVV}(p_{im,\varpi_s,ref}) \cdot \frac{R_{bg} \cdot T_{bg,em,ref}}{R_{air} \cdot T_{air,im,ref}} \cdot \left(\frac{p_{im,\varpi_s,ref}}{p_{em,ref}}\right)^{\frac{\kappa_{bg}-1}{\kappa_{bg}}}$$
$$\sigma_{s,cur} = \frac{T_{air,im,ref}}{T_{air,im,cur}} \cdot \frac{m_{air,cyl,s,ref}(p_{im,\varpi_s,ref})}{p_{im,\sigma_s,ref}}$$

In summary, the following approach for the determination of the cylinder air mass $m_{air,cyl,cur,SOAL}$ under current engine operating conditions according to the scaled overrun-air line approach is obtained:

During the measurement of the engine on the engine test stand, for selected engine speeds/actuator positions,
reference inlet air mass according to equation ((5)),
reference scavenging air mass according to equation ((6)) and
the intake pipe temperature, exhaust manifold temperature and exhaust manifold pressure, which describe the reference state, according to equations ((7-9)),
are stored in models.

For the duration under current engine operating conditions, in the control device 25, for the current operating point (engine speed/actuator position/intake pipe pressure),
1. the following reference models are read out/interpolated:
   i. reference intake pipe temperature $T_{air,im,ref}$ according to ((7))
   ii. reference exhaust manifold temperature $T_{bg,em,ref}$ according to ((8))
   iii. reference exhaust manifold pressure $p_{em,ref}$ according to ((9))
   iv. reference inlet air mass $m_{air,inv,ref}$ according to ((5))
   v. reference scavenging air mass $m_{air,scav,ref}$ according to ((6))
2. the residual gas mass under reference conditions $m_{bg,cyl,FVV,ref}$ calculated according to ((57))
3. the residual gas mass under current conditions $m_{bg,cyl,FVV,cur}$ calculated according to ((58))
4. the gradient of the overrun-air line under current conditions $\sigma_{s,cur}$ calculated according to ((70))
5. the cylinder air mass under current conditions $m_{air,cyl,cur,SOAL}$ calculated according to ((54))

Abbreviations of the Variables m=mass
p=pressure
R=specific gas constant
T=temperature
V=volume
κ=isentropic coefficient, dependent on the gas composition and temperature
ρ=gas density
α=gradient of a straight line Abbreviations of the Indices air=may generally be composed of FG and BG
bg=exhaust gas (burnt gas)
CLP=variable relating to the closing time of valves (closure point) cur=current operating conditions, corrections generally provide a contribution to the result dpl=displaced=displaced by RG (not to be confused with displacement (swept volume))
em=exhaust manifold
EXV=variable relating to the outlet valve (exhaust valve)
im=intake manifold
INV=variable relating to the inlet valve
OPP=variable relating to the opening time of valves (opening point)
ref=reference conditions prevailing during measurement of the engine on the engine test stand
rg=residual gas
s=variable relating to the brief overrun engine operation; variables without, s relate to normal fired engine operation
scav=scavenging, describes an engine operating state in which the air mass drawn in from the IM is conducted directly into the exhaust tract 4 without participating in the combustion Embodiments of this approach may provide the following potential advantages, among others:

Since the correction of ambient pressure influences is now calculated from a set of formulae rather than by way of data-driven local correction, a considerable amount of memory capacity of the control device is saved—several kB.

Furthermore, the outlay for calibration is drastically reduced because, owing to the fact that the engine geometry is taken into consideration, the measurement of the engines under changed ambient conditions can be reduced to a much coarser raster.

The mapping of component derivatives (specifically different exhaust systems in vehicle derivatives) is thus, for the first time, made possible while maintaining the base dataset (in the existing software solutions).

The underlying FVV residual gas approach has the problem that the absolute residual gas quantity is, under some circumstances, determined only very inaccurately. This leads to problems during real engine operation. The combination with the data-driven approach for mapping the base air mass flow curves taking into consideration the theoretical charge yields a very good scaling tool for standardizing the relative residual gas profile of the FVV approach to the absolute values.

The control device 25 may carry out the approach described above and thus, in particular, determine the cylinder air mass situated in the respective cylinder after closure of the gas exchange valves for the current operating point and the at least one ambient variable, in a manner dependent on the gradient of the overrun-air line and a current characteristic value of a characteristic variable influenced by the ambient variable.

In this context, the control device may carry out the approach described above. For this purpose, it may comprise a program and data memory, and a corresponding processing unit, such as a microprocessor.

What is claimed is:

1. A method for operating an internal combustion engine having one or more cylinders each assigned corresponding gas inlet valves and gas outlet valves, wherein gas exchange valves comprise gas inlet valves and gas outlet valves, the method comprising:
    determining a gradient of an overrun-air line for a current ambient value of at least one ambient variable of the internal combustion engine based at least in part on a current operating point of the internal combustion engine,
    wherein the overrun-air line corresponds to an air mass situated in the respective cylinder after closure of the gas exchange valves if, in the case of the internal combustion engine being at a predefined operating temperature, said internal combustion engine is operated briefly without fuel metering and combustion, and
    determining cylinder air mass situated in the respective cylinder after closure of the gas exchange valves based at least in part on the respective current operating point and the respective current ambient value of the at least one ambient variable, and
    using the determined cylinder air mass to adjust one or more operating parameters of the internal combustion engine.

2. The method according to claim 1, in which the at least one ambient variable is an ambient temperature or an ambient pressure.

3. The method according to claim 1, in which
a residual gas mass for the respective cylinder is determined under predefined reference conditions in relation to the at least one ambient variable in a manner dependent on the current operating point,
a residual gas mass for the respective cylinder is determined taking into consideration the respective current ambient value of the at least one ambient variable in a manner dependent on the current operating point, and
the cylinder air mass is determined in a manner dependent on the residual gas mass for the respective cylinder under predefined reference conditions and the residual gas mass for the respective cylinder taking into consideration the respective current ambient value of the at least one ambient variable.

4. The method according to claim 1, wherein
a reference intake pipe temperature is determined under predefined reference conditions in relation to the at least one ambient variable in a manner dependent on the current operating point, and
the cylinder air mass is determined in a manner dependent on the reference intake pipe temperature.

5. The method according to claim 1, wherein
a reference exhaust manifold temperature is determined under predefined reference conditions in relation to the at least one ambient variable in a manner dependent on the current operating point, and
the cylinder air mass is determined in a manner dependent on the reference exhaust manifold temperature.

6. The method according to claim 1, wherein
a reference exhaust manifold pressure is determined under predefined reference conditions in relation to the at least one ambient variable in a manner dependent on the current operating point, and
the cylinder air mass is determined in a manner dependent on the reference exhaust manifold pressure.

7. The method according to claim 1, wherein
a reference inlet air mass is determined under predefined reference conditions in relation to the at least one ambient variable in a manner dependent on the current operating point, and
the cylinder air mass is determined in a manner dependent on the reference inlet air mass.

8. The method according to claim 1, wherein
a reference scavenging air mass is determined under predefined reference conditions in relation to the at least one ambient variable in a manner dependent on the current operating point, and
the cylinder air mass is determined in a manner dependent on the reference scavenging air mass.

9. A device for operating an internal combustion engine having multiple cylinders which are each assigned gas inlet valves, the device comprising:
- sensors for measuring a current value of at least one ambient variable of the internal combustion engine;
- a controller having a processor configured to determine a gradient of an overrun-air line for the current value based at least in part on a current operating point of the internal combustion engine;
- wherein, if the internal combustion engine is at a predefined operating temperature, the overrun-air line corresponds to an air mass situated in the respective cylinder after closure of the gas exchange valves if the internal combustion engine is operated briefly without fuel metering and combustion;
- the processor further configured to determine a value of cylinder air mass situated in the respective cylinder after closure of the gas exchange valves based at least in part on the current operating point and the current value of the at least one ambient variable; and
- the processor further configured to adjust an operating parameter of the internal combustion engine based on the determined value of the cylinder air mass.

* * * * *